United States Patent
Kuehbeck

(10) Patent No.: US 11,829,159 B2
(45) Date of Patent: Nov. 28, 2023

(54) METHOD OF ORGANIZING SELF-DRIVING VEHICLES ON A HIGH SAFETY LEVEL BY RETROFITTING AND INFRASTRUCTURE SUPPORT

(71) Applicant: Thomas Kuehbeck, Redwood City, CA (US)

(72) Inventor: Thomas Kuehbeck, Redwood City, CA (US)

( * ) Notice: Subject to any disclaimer, the term of this patent is extended or adjusted under 35 U.S.C. 154(b) by 231 days.

(21) Appl. No.: 17/455,355

(22) Filed: Nov. 17, 2021

(65) Prior Publication Data
US 2022/0163977 A1    May 26, 2022

Related U.S. Application Data

(60) Provisional application No. 63/116,178, filed on Nov. 20, 2020.

(51) Int. Cl.
| | |
|---|---|
| G05D 1/02 | (2020.01) |
| H04W 4/44 | (2018.01) |
| B60W 60/00 | (2020.01) |
| G06F 18/25 | (2023.01) |

(52) U.S. Cl.
CPC ....... G05D 1/0293 (2013.01); B60W 60/0015 (2020.02); G05D 1/0289 (2013.01); G06F 18/25 (2023.01); H04W 4/44 (2018.02); B60W 2556/50 (2020.02)

(58) Field of Classification Search
CPC .................................................. G05D 1/0293
See application file for complete search history.

(56) References Cited

U.S. PATENT DOCUMENTS

| | | | |
|---|---|---|---|
| 7,085,637 B2* | 8/2006 | Breed ................... | G08G 1/163 |
| | | | 701/470 |
| 2005/0060069 A1* | 3/2005 | Breed ................... | G08G 1/166 |
| | | | 701/408 |
| 2020/0247406 A1* | 8/2020 | Huang .............. | B60W 30/0956 |

FOREIGN PATENT DOCUMENTS

| | | | | |
|---|---|---|---|---|
| CA | 3052234 A1 * | 8/2018 | .............. | G06N 7/08 |
| CN | 112068548 B   * | 6/2022 | .......... | G05D 1/0246 |

OTHER PUBLICATIONS

Parallel Extended European Search Report of 20 209291.2, dated Jun. 1, 2021, 11 pages.

* cited by examiner

*Primary Examiner* — Shelley Chen
(74) *Attorney, Agent, or Firm* — Lewis Roca Rothgerber Christie LLP

(57) ABSTRACT

A method of organizing a trajectory of at least one self-driving vehicle including providing the vehicle having a first localization sensor and a second localization sensor, wherein the functionality of the sensors are different; driving the vehicle in a self-driving mode in a lane; determining the localization of the vehicle, using at least one of the first localization sensor and the second localization sensor, with an accuracy of at least 25 cm in order to obtain a first data set; providing a smart infrastructure in proximity to the lane comprising one or more status sensors arranged along the lane; determining a status information of the vehicle by the smart infrastructure, using the one or more status sensors, in order to obtain a second data set, and coordinating the first data set and the second data set to derive a cooperative strategy for organizing the trajectory of the vehicle.

17 Claims, 4 Drawing Sheets

METHOD OF ORGANIZING SELF-DRIVING VEHICLES ON A HIGH SAFETY LEVEL BY RETROFITTING AND INFRASTRUCTURE SUPPORT

CROSS-REFERENCE TO RELATED APPLICATION

The present application claims priority to and the benefit of U.S. Provisional Patent Application No. 63/116,178, filed Nov. 20, 2020, the entire disclosure of which is incorporated herein by reference.

TECHNICAL FIELD

The present disclosure refers to a method of organizing a trajectory of a self-driving vehicle, in particular a plurality of vehicles. Therefore, the present disclosure may refer to the technical field of self-driving vehicles, in particular to the technical field of organizing trajectories and safety issues with respect to self-driving vehicles.

TECHNOLOGICAL BACKGROUND

Self-driving may be considered as a future key technology in the automotive research, development, and industry. Recently, at least partially self-driving vehicles with self-driving modes have become available to the public and are purchasable by now. However, these vehicles are generally not able to perform self-driving on a high safety level. The safety level of a self-driving mode may be seen as an important factor or even the key issue for the future of self-driving vehicle development.

A conventional vehicle may drive in a self-driving mode in a safe manner if only standard situations occur, e.g. driving along a highway in good weather conditions. However, there will constantly occur non-standard and potentially dangerous situations, for example construction sites or heavy snow fall, which cannot be handled by the self-driving mode on a low safety level without the interference a driver. In this case, the self-driving mode is neither safe nor very useful for the driver. Even though many self-driving modes may be based on machine learning algorithms which can be trained and thereby improved, it seems nearly impossible to train the algorithms to handle all possible kinds of potentially dangerous situations.

Further, even conventional self-driving modes at high safety level may suffer drawbacks. For example, during acceleration in the self-driving mode, vehicles may become virtually (i.e. by the algorithm) longer by increasing the respective distance to other vehicles. In other words, the safety margin set by the ACC (adaptive cruise control) may be too large for the present traffic situation. Such a non-determinism of self-driving systems may generate traffic jams (so-called ripple effect, in particular intensified by latency of sensorics/applications) in a traffic flow. A main cause of these undesired traffic flows may be seen in the circumstance that each (self-driving) vehicle in the traffic flow applies its own functionalities and strategies.

In summary, it is still a challenge to organize self-driving vehicles in a safe, reliable, and also efficient manner. In order to improve the safety level of commercial vehicles (i.e. commercial end products), enormous efforts would have to be done to completely change the hardware and software to be conform with a higher safety level. However, even these changes may not overcome issues with respect to the organization of the traffic flow (see e.g. the ripple effect) and the occurrence of unknown dangerous situations (e.g. construction sites, heavy weather conditions, etc.).

There may be a need to enable commercial vehicles with low-safety self-driving modes (in particular at safety level L2) to drive at high-safety self-driving modes (in particular at least safety level L4) in a safe, reliable, and (cost) efficient manner.

SUMMARY OF THE PRESENT DISCLOSURE

Methods of organizing a trajectory and retrofitting according to the independent claims are described. Exemplary embodiments are described by the dependent claims.

According to an aspect of the present disclosure, it is described a method of organizing a trajectory of at least one (at least partially) self-driving vehicle (in particular at safety level L2), the method comprising:

i) providing the vehicle, wherein the vehicle comprises a first localization sensor (in particular a self-positioning sensor) and a second localization sensor (in particular an object-localization sensor), wherein the functionality of the second localization sensor (e.g. camera) is different from the functionality of the first localization sensor (e.g. ground penetrating radar), ii) driving the vehicle in a self-driving mode in a lane (in particular in a traffic flow), iii) determining the localization (in particular also a vehicle-determined status information) of the vehicle, using (at least one of) the first localization sensor and the second localization sensor (in a specific example, e.g. differential GNSS, also using the status sensor from the smart infrastructure), with an accuracy of at least 25 cm (in particular at least 20 cm, more in particular at least 15 cm, more in particular at least 10 cm) in order to obtain a first data set (self-localization data) (in particular wherein the first data set comprises also object data), iv) providing a smart infrastructure in proximity to the lane, wherein the smart infrastructure comprises one or more status sensors (in particular a plurality of status sensors) arranged along the lane (in the direction of traffic flow), v) determining a status information (e.g. localization, velocity, distance, etc.) of the vehicle by the smart infrastructure, using the one or more status sensors, in order to obtain a second data set (indicative of a status of the vehicle), and vi) coordinating the first data set and the second data set to derive a cooperative strategy for organizing the trajectory of the vehicle (in particular wherein the cooperative strategy enables/allows the self-driving mode to be at least on safety level L4).

The vehicle is a commercial end product, and the method further comprises:

vii) providing/fitting the first localization sensor and/or the second localization sensor by retrofitting (the first localization sensor and/or the second localization sensor to) the commercial end product.

According to a further aspect of the present disclosure, a method of retrofitting a vehicle is described, wherein the vehicle is a commercial end product and comprises a self-driving mode. The method comprising:

i) retrofitting the vehicle with a first localization sensor and/or a second localization sensor, wherein the functionality of the second localization sensor is different from the functionality of the first localization sensor, so that the localization of the vehicle can be determined using at least one of the first localization sensor and the second localization sensor (in particular both), with an accuracy of at least 25 cm (in particular at least 15 cm) in order to obtain a first data set, ii) retrofitting the vehicle with a communication unit for communicating with a smart infrastructure in proximity to a lane, which smart infrastructure determines a status information (using at least one determination sensor) of the vehicle in order to obtain a second data set, and iii) retrofitting the vehicle with a control device that is configured to coordinate and/or to trigger a further entity (e.g. the smart infrastructure or a further vehicle) to coordinate the first data set and the second data set to derive a cooperative strategy for organizing the trajectory of the vehicle (in particular wherein the cooperative strategy allows the self-driving mode to be at least on safety level L4).

In the context of the present document, the term "self-driving mode" may refer to a driving mode of a vehicle, which mode enables the vehicle to control the driving (in particular acceleration, steering, braking) at least partially without the interference from a human driver. A vehicle in a self-driving mode may be capable of sensing its environment and move safely with little or no human input. A self-driving vehicle may also be termed highly automated vehicle, driverless car, robotic car, or (fully) automated vehicle. In a self-driving mode, a vehicle may for example combine a variety of sensors to perceive the surroundings, while a control system interprets the sensor information to calculate one or more trajectories, taking into account e.g. other vehicles, traffic signs, and obstacles. In the context of this document, a self-driving mode may be further a self-driving mode that is at least on safety level L1, in particular at least L2 (see definition below).

In the context of the present document, the term "safety level" may in particular refer to the level of required driver attention during driving in a self-driving mode. At low-safety level, the driver would have to be constantly attentive, because the self-driving mode may not be able to solve emergency situations by itself. On the other hand, a high safety level would mean that the self-driving mode is able to handle all dangerous situations by itself, so that the driver is not required to take action anymore.

The safety levels L0 to L5 may be based on the classification system with six levels published in 2014 by SAE International, an automotive standardization body, as J3016: *"Taxonomy and Definitions for Terms Related to On-Road Motor Vehicle Automated Driving Systems"*.

Accordingly, the definition of safety level L2 may be as follows: the automated system takes full control of the vehicle, in particular accelerating, braking, and steering. The driver must monitor the driving and must be prepared to intervene immediately at any time, if the automated system fails to respond properly. Contact between hand and wheel may often be mandatory during L2 driving, in order to confirm that the driver is ready to intervene. The eyes of the driver might be monitored by cameras to confirm that the driver is keeping attention to the traffic.

Accordingly, the definition of safety level L4 may be as follows: the driver can safely turn his attention away from the driving tasks, e.g. the driver can text or watch a movie. The vehicle will handle even situations that call for an immediate response, like emergency braking. No driver attention is required for safety, e.g. the driver may safely go to sleep or even leave the driver seat. However, self-driving may be supported only in limited spatial areas (geofencing) or under special circumstances. Outside of these areas or circumstances, the vehicle is able to safely abort the trip (e.g. park the car), if the driver does not retake control. An example would be a robotic taxi or a robotic delivery service that only covers selected locations in a specific area.

In the context of the present document, the term "localization sensor" may in particular refer to a sensor functionality that provides information with respect to a localization (of the vehicle). This information may comprise absolute and relative data. For example, the localization sensor may comprise a self-localization functionality, so that the sensor can determine the position of the vehicle. In another example, the localization sensor may comprise an object-localization functionality such that the sensor can determine e.g. the distance, position, or velocity of an object such as another vehicle or an obstacle. Hereby, the localization sensor may provide information with respect to the localization of said object. In another example, the object-localization sensor may determine information from the environment (e.g. a landscape, a traffic sign, etc.) which can be used in order to localize the position of the vehicle.

In the context of the present document, the term "first data set" may in particular refer to a set of self-localization data determined (substantially) by the vehicle. For determining the first data set, the vehicle may comprise a first localization sensor and (e.g. for redundancy) a second localization sensor. The first localization sensor may be a self-localization sensor, for example a GPS and/or a ground penetrating radar. The second localization sensor may be an object-localization sensor, for example a camera and/or a radar. The measurement data of the first localization sensor and the second localization data may be combined or used separately. For example, the first localization sensor may be a ground penetrating radar and the second localization sensor may be a camera. In this case, the ground penetrating data may be used for accurate position determination (independent of weather conditions), while the camera data are used as a localization control (redundancy, cross-check). In another example, the first localization sensor may comprise a GPS functionality that works in conjunction with a differential GNSS (global navigation satellite system) of a smart infrastructure in order to obtain the first data set. The accuracy of the self-localization (in particular based on the first localization sensor) should be at least 25 cm (in particular at least 15 cm). In other words, the accuracy of the first data set may be higher than the accuracy of GPS data alone.

In the context of the present document, the term "smart infrastructure" may in particular refer to a plurality of elements which are arranged with respect to at least one lane of a road. An exemplary example of a smart infrastructure may be the "Digitales Testfeld Autobahn" infrastructure between Munich and Ingolstadt. In a basic example, a smart infrastructure may comprise a plurality of (status) sensors which are positioned next to the lane in the direction of the traffic flow. The status sensors may hereby determine status information of the vehicles of the traffic flow. Further, the status sensors may determine further status information regarding e.g. obstacles or construction sides. In another example, the smart infrastructure comprises very accurate status sensors such as radar and/or differential GNSS in order to exactly localize vehicles and/or obstacles. In a further example, the status sensors of the smart infrastructure may be coupled with a control system that combines the status data and develops (calculates) traffic flow strategies, object environment maps, and trajectories. Regarding a single vehicle, the smart infrastructure may communicate with the vehicle, e.g. by providing the status data within a second data set which may further contain a proposed infrastructure-calculated trajectory or an alternative emergency trajectory. The trajectory may be calculated based on the data of one status sensor or based on the data of a plurality of status sensors. The vehicle may send localization information as a first data set to the smart infrastructure.

In the context of the present document, the term "status sensor" may refer to any sensor functionality that can be coupled to a smart infrastructure (see above) and that is configured to determine status information with respect to vehicles and/or obstacles within a traffic flow. For example, a status sensor may comprise one of the following: a distance sensor, a velocity sensor, a localization sensor, a camera, a radar, a GPS, a differential GNSS. The status information determined by the status sensor may for example include a localization, a distance, or a velocity of the vehicle and/or the obstacle (these status data may be absolute or relative).

In the context of the present document, the term "second data set" may refer to a set of status data determined by the smart infrastructure. The smart infrastructure may comprise a plurality of status sensors (see above) which are configured to obtain status data from a vehicle, in particular from a plurality of vehicles in a traffic flow. The second data set may further comprise (proposed) vehicle trajectories calculated by the smart infrastructure.

In the context of the present document, the term "cooperative strategy" may refer to a method (in particular an instruction/guidance) of organizing and optimizing the trajectory of at least one self-driving vehicle in a traffic flow based on at least two data sets (first and second data set) from at least two different entities (vehicle(s) and smart infrastructure). While the first entity may be the vehicle itself, the second entity may be a smart infrastructure and/or a further vehicle. The data sets may comprise localization information and status information with respect to the vehicle. This information may be combined (fused) to derive the cooperative strategy which may lead to the provision of a trajectory for the vehicle, wherein the trajectory is based on data measured by different entities, in particular wherein the trajectory is coordinated with the trajectory of other vehicles in the traffic flow. For example, if the determined data sets are slightly different from each other, an average data set may be formed. In case that the data sets are clearly different from each other, one of the data sets may comprise a measurement error. However, the combination of data sets may contain enough information to identify and exclude the error. Based on the cooperative strategy, one or a plurality of trajectories may be provided/calculated (by different entities). The calculated trajectories may be combined or a preferred trajectory may be selected. The cooperative strategy may further comprise the circumstance that additional input (from different entities) is provided to the trajectories, e.g. feed-back information, trajectory boundaries, emergency information, etc.

In the context of the present document, the term "commercial end product" may refer to any product which has already been manufactured and which is, in its present final state, ready for commercial sale (purchase). In other words, a commercial end product is a product which is not in a manufacturing process, i.e. not a semi-finished product, but a finished product. For example, a vehicle such as a car is a commercial end product, when it leaves a car manufacturing facility and is ready to be provided to a costumer. It may not be necessary that the costumer performs any changes regarding the vehicle. Instead, the consumer may immediately take a seat in the commercial end product and start driving. In an example, it is not planned or foreseen that the costumer has to perform any change to the commercial end product. In the contrary, the manufacturer may not wish that changes are done, since the commercial end product already fulfills all its needs.

In the context of the present document, the term "retrofitting" may in particular refer to a process step, in which a component, e.g. a sensor or a communication device, is fitted to a commercial end product. While the term "fitting" may refer to providing a component (such as the sensor) to a semi-finished product during a manufacturing process, the term "retrofitting" may only refer to the provision of a component to an already finished end product. For example, a conventional car may be considered a commercial end product. Said car may comprise a self-driving mode on safety level L2. It may be intended by the manufacturer that the car does not comprise a self-driving mode on safety level L4. Accordingly, the car may not comprise the required sensors for realizing self-driving on safety level L4. Providing such sensors to the car would not be a fitting, because the car is already a commercial end product. Accordingly, providing the sensors to the commercial end product would be a retrofitting. Thus, the term "retrofitting" may refer to a method step of extraordinary and unplanned modification of a product, which product is actually considered as ready and essentially unchangeable. According to an example, there is provided a retrofitting of communication and automated driving functionality with low cost hardware.

According to an exemplary embodiment, the present disclosure may be based on the idea that commercial vehicles (i.e. commercial end products) with low-safety self-driving modes (in particular safety level L2) are enabled to be driven in high-safety self-driving modes (in particular at least on safety level L4) in a safe, reliable, and (cost-) efficient manner, when the commercial end product is retrofitted with a highly accurate localization sensor functionality (preferably independent of weather conditions) to provide a first data set which is then supplemented by a second data set provided by a smart infrastructure (during driving in the self-driving mode). Thereby, the first data set and the second data set are combined (within the vehicle and/or within the smart infrastructure) in order to derive a cooperative strategy that results in a highly secure trajectory that can be driven (essentially) without human interference.

Conventional vehicles are often not able to perform self-driving on a high safety level. In order to improve the safety level of commercial vehicles, enormous efforts have to be done to completely change the hardware and software. However, even self-driving on a high safety level may cause drawbacks such as hampering the traffic flow or inadequate reaction to unknown situations/conditions.

It has now been surprisingly found by the inventors that a cooperative strategy, which enables secure and reliable self-driving vehicle trajectories, may be provided using only minimal vehicle penetration with low cost hardware and support by infrastructure sensorics. The described cooperative strategy, based on a retrofit of older vehicle generation hardware and infrastructure sensor data, may allow full automation (self-driving at high safety levels) of the majority of (commercial) vehicles.

While conventionally each vehicle follows its own strategy, it is proposed here a completely different approach, wherein a cooperative strategy between different entities (vehicles and infrastructure) is derived so that a safe, reliable, and efficient trajectory is provided to the vehicle(s) in a traffic flow.

DESCRIPTION OF EXEMPLARY EMBODIMENTS

According to an embodiment, the first localization sensor comprises a self-localization functionality. In particular at least one of the group which consists of: a self-localization sensor, a positioning functionality being (essentially) independent of weather conditions, a GPS (global positioning system) functionality, a SLAM (simultaneous-localization and mapping) functionality, a GPR (ground penetrating radar). In particular in the case of the GPR, the first localization sensor may be arranged at the bottom of the vehicle.

The first (position) localization sensor may provide the advantage that a self-localization with high accuracy (higher than the accuracy of GPS alone) is enabled, so that a cooperative strategy on safety level L4 or more is possible, using established technology, that can be retrofitted in a feasible manner. Preferably, the first sensor is independent of weather conditions, i.e. it may function (essentially) without limitations in conditions of e.g. high snow fall or heavy rain. In an embodiment, the first localization sensor performs the high accuracy self-localization in conjunction with data (e.g. localization using camera/radar information) from the second localization sensor. In another example, the first localization sensor performs the high accuracy self-localization in conjunction with data (e.g. differential GNSS) from status sensor(s) of the smart infrastructure. With respect to the smart infrastructure, the GPR may be used for redundant localization, in particular since there is (essentially) no impact of weather conditions for localization.

The term "ground-penetrating radar" may in particular refer to a physical method that uses radar pulses to image the subsurface below a road (lane). GPR may be a non-destructive, non-invasive method that uses in particular electromagnetic radiation in the microwave band (UHF/VHF frequencies) of the radio spectrum, and detects the reflected signals from subsurface structures (e.g. subsurface objects, material properties, voids and cracks). The principle of GPR may be applied to localize a vehicle with high accuracy by comparing the measurement of the GPR with prior map-based images. GPR may be (completely) independent of weather conditions and may function in conjunction with a further localization functionality such as GPS. The term "GPS" may refer to the well-established satellite-based radionavigation system (GNSS) that provides geolocation and time information to a GPS receiver.

According to a further embodiment, the second localization sensor comprises an object-localization functionality. In particular one of the group which consists of a camera, a radar, a lidar. In a preferred embodiment, the second localization sensor is arranged at the front of the vehicle.

The second (object) localization sensor may provide the advantages that i) a self-localization with high accuracy is enabled (in conjunction with the first localization sensor, e.g. by recognizing a specific environment) and that ii) objects (such as other vehicles and obstacles) as well as their velocity/distance can be taken into account, so that a cooperative strategy is possible, using established technology that can be retrofitted in a feasible manner. Retrofitting a commercial end product may be done cost efficiently by coupling a camera/radar to the vehicle. The camera may be used for redundant object detection, lane detection, and visual localization.

The term "lidar" may in particular describe a method for measuring distances by illuminating the target with laser light (not radio pulses as with radar) and measuring the reflection of the laser light with a sensor. Differences in laser return times and wavelengths can then be used to provide 3-D representations of the target.

According to a further embodiment, the status sensor(s) comprise(s) at least one of the group which consists of: a distance sensor, a velocity sensor, a localization sensor, a camera, a radar, a GPS, a differential GNSS. This may provide the advantage that status information with respect to a plurality of vehicles can be obtained using established technology. In an embodiment, the smart infrastructure is a commercial end product and fitting the smart infrastructure with at least one status sensor comprises retrofitting.

The term "differential GNSS (global navigation satellite system)" may in particular refer to a high precision GPS/GNSS that improves GPS measurements. In an example, the accuracy of GPS may be around 15 meters, while the accuracy of differential GNSS may be around 10 cm or less. In the context of this document, the term "GPS" may not include differential GNSS, while the term "differential GNSS" may not include GPS. While GPS may refer to a system of the USA, GNSS may also refer to system in Europe (Galileo), China (Baidou), Russia (Glonass) etc. The term "GPS" may be used in this document as a general term for a navigation system and may include "GNSS".

According to a further embodiment, the status information comprises at least one of the following: i) a localization of the vehicle and/or an obstacle, ii) a velocity of the vehicle and/or the obstacle, iii) a distance between the vehicle with respect to the smart infrastructure, iv) a distance between the vehicle and the obstacle. In this manner, the status information may include enough information to enable the derivation of the cooperative strategy and/or the calculation of trajectories (and/or an object environment map) for a plurality of vehicles by the smart infrastructure.

In this document, the term "obstacle" may in particular refer to an object, a localization, an animal, or a person that is not intended to be in proximity to the traffic flow or the lane, respectively. Such an obstacle may hamper the traffic flow and/or cause dangerous or even emergency situations. The obstacle may be considered a severe risk for the safety of the vehicle. While another vehicle may be coupled with the vehicle and/or the smart infrastructure (e.g. via radio, WiFi, etc.), an obstacle may not be couple-able with the vehicle and/or infrastructure. For example, the object may be a box or a fridge that lies directly on the lane and may cause a collision with a vehicle. Such an object may be in motion and can accordingly comprise a velocity. Another obstacle may be a living organism, e.g. a human that is confused after a car accident or a wild animal. In another example, the obstacle may be a construction site that may not be recognized by a self-driving algorithm. By recognizing at least one status information of the obstacle, the smart infrastructure may provide essential trajectory boundaries or (emergency) trajectories to the vehicle(s) in order to enable self-driving at safety level L4 or more.

According to a further embodiment, the method further comprises i) driving a further vehicle in a further self-driving mode in the lane or in a further lane in proximity to the lane, ii) determining a further status information of the further vehicle by the vehicle (using the second localization sensor) and/or by the smart infrastructure (using the status sensor), in order to obtain a third data set. Hereby, deriving the cooperative strategy further comprises: iii) coordinating the first data set and the second data set with the third data set. In this manner, the data indicative of a further vehicle may be coupled with the vehicle and/or the infrastructure data, so that the cooperative strategy is further improved.

Thereby, the provision of coordinated (and hence more efficient and safe) trajectories of the vehicles may be enabled.

According to a further embodiment, the method further comprises: i) providing the further vehicle, wherein the further vehicle comprises a third localization sensor and a fourth localization sensor, wherein the forth localization sensor is different from the third localization sensor, ii) determining a localization of the further vehicle, using at least one of the third localization sensor and the fourth localization sensor, with an accuracy of at least 25 cm (in particular at least 15 cm) in order to obtain a fourth data set. Hereby, deriving the cooperative strategy further comprises: iii) coordinating the first data set, the second data set, and the third data set with the fourth data set.

According to a further embodiment, the further vehicle is a further commercial end product, and wherein the method further comprises providing at least one of the third sensor and the fourth sensor by retrofitting the further commercial end product.

In principle, the further vehicle may be retrofitted in the same manner as the vehicle (see description above). The reliability and safety in a self-driving system traffic flow may be highly improved, if a plurality of vehicles can be coupled to the derivation of the cooperative strategy. An ideal situation may thus be that the majority of vehicles in a self-driving system traffic flow are coupled/connected with each other and optimize their driving strategy by combining their data sets into a cooperative strategy. Using the retrofitting described above, said majority of vehicles (based on commercial end products) can be obtained.

According to a further embodiment, the self-driving mode and/or the further self-driving mode is at safety level L2, and the cooperative strategy allows the self-driving mode and/or the further self-driving mode to be changed (improved) to at least safety level L4. In particular, the cooperative strategy organizes e.g. at least one of lane-keeping, construction side determination, and distance-keeping, in accordance with L4 mode requirements. Thereby, dangerous situation (which may not be handled by a self-driving mode on safety level L2) may be handled successfully by the cooperative strategy such that the self-driving mode may be considered a safety level L4 mode.

According to a further embodiment, the cooperative strategy comprises: i) coordinating the first data set with the second data set by the vehicle, ii) deriving a vehicle-calculated trajectory based on the coordination result, and iii) controlling at least one actuator (in particular regarding acceleration, braking, steering) of the vehicle based on the vehicle-calculated trajectory. In this example, the derivation of the cooperative strategy and/or the calculation of the trajectory is done within (a control unit of) the vehicle (based on data from the vehicle and the smart infrastructure).

According to a further embodiment, the cooperative strategy comprises: i) deriving a vehicle-calculated trajectory, ii) deriving a further vehicle-calculated trajectory by the further vehicle and/or deriving an infrastructure-calculated trajectory by the smart infrastructure, iii) comparing the vehicle-calculated trajectory with the further vehicle-calculated trajectory and/or the infrastructure-calculated trajectory (by the vehicle and/or by the smart infrastructure), and iv) selecting one preferred trajectory or deriving a trajectory combination (by the vehicle and/or by the smart infrastructure).

In these examples, different trajectories are provided based on the cooperative strategy, i.e. a vehicle-calculated trajectory, a further vehicle-calculated trajectory, and an infrastructure-calculated trajectory. All or some of these trajectories may be compared by one of the entities and then, a final trajectory may be derived. For example, one of the trajectories may be selected based on (predetermined) criteria. In another example, the calculated trajectories are combined based on (predetermined) criteria to develop a further improved combined trajectory. The combined trajectory may also include optimizations, trajectory boundaries, and feed-back information.

According to a further embodiment, the cooperative strategy comprises at least one of the following features:
 i) providing status data (in particular localization data and/or velocity data, also optimization, back-up, and feedback information) to the vehicle and/or the further vehicle by the smart infrastructure,
 ii) providing an infrastructure-calculated trajectory to the vehicle and/or the further vehicle by the smart infrastructure,
 iii) providing a vehicle-calculated trajectory by the vehicle to the further vehicle,
 iv) providing a further vehicle-calculated trajectory by the further vehicle to the vehicle,
 v) providing a further infrastructure-calculated trajectory (in particular an emergency trajectory) to the vehicle and/or the further vehicle by the smart infrastructure,
 vi) providing an emergency reaction (in particular a warn sign), calculated by the smart infrastructure, to the vehicle and/or the further vehicle,
 vii) controlling at least one actuator (in particular with respect to acceleration, steering, braking) of the vehicle and/or the further vehicle (directly by the vehicle or) indirectly via the cooperative strategy by the smart infrastructure.

The described exemplary options of implementing the cooperative strategy may be used dynamically depending on the traffic conditions. Thereby, a highly efficient self-driving system may be established, wherein there are enough (redundant) information and trajectories present to follow a reliable and safe strategy for (nearly) all vehicles in the system.

According to a further embodiment, the cooperative strategy is free of a machine learning algorithm. This may provide the advantage that no complex training of algorithms has to be performed, while the reactions of the system can be standardized and validated.

According to a further embodiment, the cooperative strategy comprises a fleet algorithm or a swarm intelligence algorithm. Thereby, the derivation of the cooperative strategy may be implemented using established and powerful algorithms.

According to a further embodiment, the vehicle and/or the further vehicle is one of the group which consists of a car, a truck, a motor cycle, a van, a mobile home, a bus. Most advantageously, the described retrofitting may be performed with nearly all kinds of commercial end products in the context of automotive. Thus, the majority of commercial vehicles that comprises a self-driving mode may be upgraded to safety level L4 using the described combination of retrofitting and smart infrastructure to derive the cooperative strategy.

According to a further embodiment, data between the vehicle(s) and the infrastructure may be communicated (sent/received) via 4G, 5G, Wifi (802.11p), radio, or DSRC (dedicated short-range communication).

According to a further embodiment, the first data set and the second data set may comprise object data. Vehicles may exchange object data and/or positions with other vehicles and/or the smart infrastructure.

According to a further embodiment, retrofitting further comprises retrofitting a communication unit (to the commercial end product) for communicating with the smart infrastructure (and/or other vehicles).

According to a further embodiment, retrofitting further comprises retrofitting a control device (to the commercial end product) for communicating with a vehicle interface (e.g. OnBoardDiagnose (OBD) system). The control device may calculate a (vehicle) trajectory and send said trajectory to the vehicle interface (thereby indirectly controlling e.g. steering, acceleration, braking). Further, the control device may receive data from the vehicle interface (e.g. feedback data).

DETAILED DESCRIPTION OF THE DRAWINGS

Figure 1:
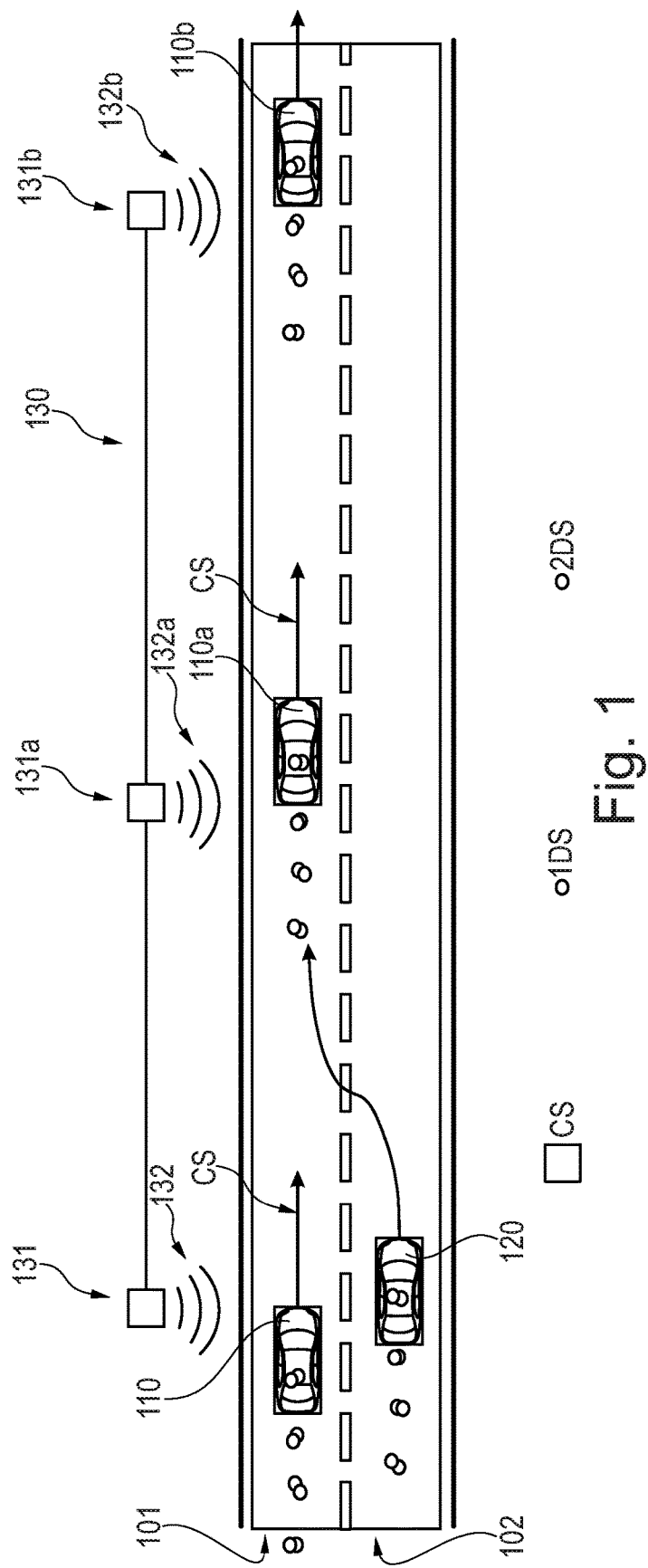
FIG. 1 shows a system of organizing self-driving vehicles according to an exemplary embodiment of the present disclosure.

Before referring to the drawings in detail, some basic aspects of the present disclosure are summarized and described with respect to exemplary embodiments in the following.

According to an exemplary embodiment, a vehicle does self-localization (by SLAM localization) using video (front side camera) and ground penetrating radar for redundancy. The ground penetrating radar is essentially independent of weather conditions and the visual localization functions as (self-localization) redundancy information for the vehicle position. The vehicle does its own fusion (deriving cooperative strategy and vehicle-calculated trajectory) of data provided by surrounding vehicles (third and fourth data sets) and data (second data set) provided from a smart infrastructure. To obtain the cooperative strategy, the smart infrastructure sends boundaries for trajectories (second data set and infrastructure-calculated trajectory). The final trajectory can be planned in the vehicle, while a redundant infrastructure-calculated trajectory is sent from the smart infrastructure for redundancy and cross-check to the vehicle. The final trajectory is then sent to the vehicle actuators.

According to an exemplary embodiment, the smart infrastructure detects vehicles, obtains odometry (velocity) of vehicles for better accuracy of detection, and sends vehicle positions (second data set) to vehicle(s). The smart infrastructure thereby sends boundaries for trajectory planning (infrastructure-calculated trajectory) to vehicle(s) (to derive the cooperative strategy). The smart infrastructure can also send a backup trajectory to vehicle(s) for redundancy and cooperative/emergency strategies. It is thus described an infrastructure and retrofitting based solution to provide automated driving at high safety level to the masses of vehicles.

According to an exemplary embodiment, four units are retrofitted to a commercial end product: a ground penetrating radar (first localization sensor), a camera (a second localization sensor), a communication unit for communicating with the infrastructure and a GPS/GNSS receiver (first localization sensor). Furthermore, a control device may be retrofitted that receives data from a vehicle interface (e.g. OnBoardDiagnose (OBD) system). The control device may calculate a trajectory (for the vehicle) and send said trajectory to the vehicle (interface/OBD) (or the infrastructure or another vehicle).

FIG. 1 shows a traffic flow system 100, wherein a trajectory of a self-driving vehicle 110 is organized in the traffic flow along a road with two lanes 101, 102. In the example shown, the vehicle 110 is driving in a self-driving mode along the first lane 101. Two other vehicles 110a, 110b can be seen in front of the vehicle 110 in the first lane 101, while a further vehicle 120 is driving in a further self-driving mode in the second lane 102. The vehicle 110 is a commercial end product (it can be directly purchased or bought from a car dealer) that comprises a self-driving mode functionality on safety level L2 (by default). The vehicle 110 comprises at least two different sensor functionalities (see FIG. 2 below for details), wherein at least one of the two sensor functionalities has been provided by retrofitting. The system 100 further comprises a smart infrastructure 130 in proximity to the first lane 101, wherein the smart infrastructure 130 comprises a plurality of status sensors 131, 131a, 131b arranged in the direction of traffic flow along the first lane 101. The plurality of status sensors 131 can for example comprise at least one of the following sensor functionalities: a distance sensor, a velocity sensor, a localization sensor, a camera, a radar, a GPS, a differential GNSS.

The vehicle 110 determines its localization (self-localization) by the two different sensor functionalities. The accuracy of the self-localization is at least 25 cm (in particular at least 15 cm) in order to obtain a first data set 1DS indicative of the vehicle geo-position (shown as dots in the Figure). The smart infrastructure 130 applies the plurality of status sensors 131 to determine status information 132 (in the Figure shown as a camera and/or radar field) in order to obtain a second data set 2DS indicative of status information regarding the vehicle 110 (shown as further dots in the Figure). It can be seen that the first data set 1DS and the second data set 2DS) with respect to the localization of the vehicle 110 are very similar (however, not exactly similar). In this manner, there is a redundancy (and cross-check) and the reliability (and safety) of the localization data is highly improved.

The described system 100 is configured to perform the following step: the first data set 1DS and the second data set 2DS are coordinated to derive a cooperative strategy CS for organizing the trajectory of the vehicle 110. This coordination can be done in the vehicle 110, the smart infrastructure 130, or in both. The cooperative strategy CS will provide a secure trajectory for the vehicle 110 in self-driving mode that takes into account the absolute position of the vehicle 110, the relative position of the vehicle 110 to the smart infrastructure 130, and the position of the vehicle 110 relative to the other vehicles 110a, 110b, 120 and obstacles (not shown) in the traffic flow. In particular, deriving the cooperative strategy CS allows that the self-driving mode (which is safety level L2 for the commercial end product) can be improved to at least safety level L4. It should be noticed that the commercial end product itself is not able to interact with the smart infrastructure 130 such that safety level L4 is enabled. Only by retrofitting the commercial end product to the vehicle 110 with a specific sensor functionality enables the upgrade from safety level L2 (low-safety self-driving mode) to L4 (high safety self-driving mode) in a (cost) efficient and reliable manner.

Preferably, the vehicle 110 and/or the smart infrastructure 130 also determine(s) a further status information of the further vehicle 120 in order to obtain a third data set indicative of a position of the further vehicle 120. Hereby, deriving the cooperative strategy CS further comprises coordinating the first data set 1DS and the second data set 2DS with the third data set. If the further vehicle 120, in particular the further vehicle 120 is also a commercial end product which has been retrofitted, performs a self-localization to obtain a forth data set, the cooperative strategy CS can further comprise: coordinating the first data set 1DS, the second data set 2DS, and the third data set with the fourth data set.

It is shown in the Figure that the further vehicle 120 changes from the second lane 102 to the first lane 101 and passes the vehicle 110. Accordingly, the vehicle 110 has to break, but only to an extend that the traffic flow is not hampered. This issue is solved in a efficient, reliable, and safe manner using the cooperative strategy CS that combines the status information of the vehicle 110, the further vehicle 120, and the smart infrastructure 130 relative to each other.

Figure 2:
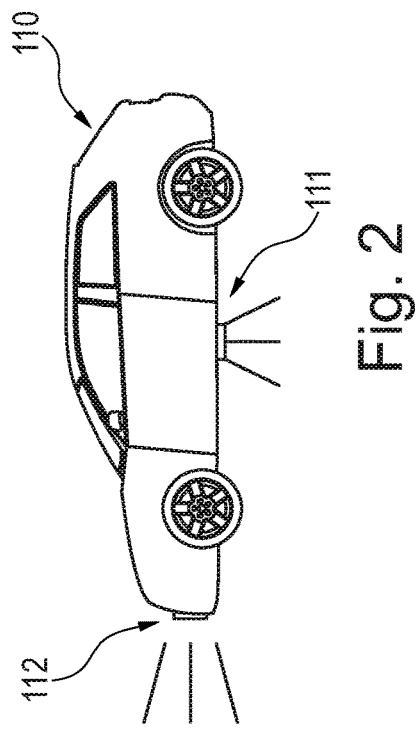
FIG. 2 shows a self-driving vehicle according to an exemplary embodiment of the present disclosure.

FIG. 2 shows a self-driving vehicle 110 according to an exemplary embodiment of the present disclosure. It can be seen that the vehicle 110 is in principle a standard commercial end product as it can be directly purchased. However, said commercial end product has been fitted with two additional sensor functionalities, wherein the fitting is a retrofitting. The vehicle comprises now a first localization sensor 111 being a self-localization sensor and a second localization sensor 112 being an object-localization sensor. In the example shown, the first localization sensor 111 is a ground penetrating radar (GPR) that is arranged at the bottom of the vehicle. The GPR enables a self-localization with an accuracy of at least 25 cm (in particular at least 15 cm). In the example shown, the second localization sensor 112 comprises a camera and/or a radar arranged at the front of the vehicle 110. The object-localization sensor 112 functions in conjunction with the self-localization sensor 111, wherein the object-localization sensor 112 complements self-localization data by detecting the position of objects in the environment and/or provides status information regarding other vehicles and obstacles.

Figure 3:
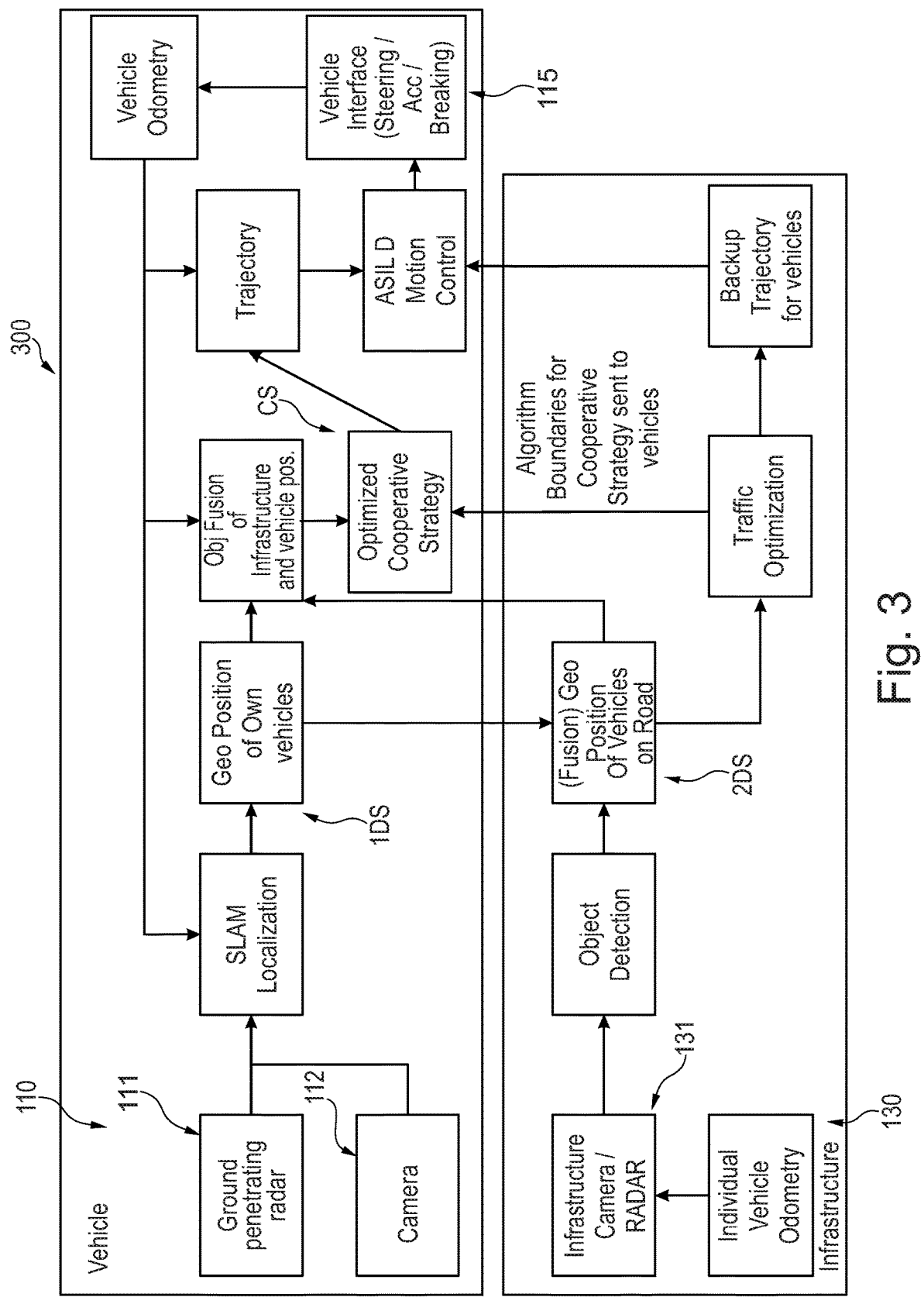
FIG. 3 shows deriving a cooperative strategy between a vehicle and a smart infrastructure according to an exemplary embodiment of the present disclosure.

FIG. 3 shows a flowchart of deriving the cooperative strategy CS between the vehicle 110 and the smart infrastructure 130 in a traffic flow system 300 according to an exemplary embodiment of the present disclosure. In this exemplary example, the first sensor 111 of the vehicle 110 comprises a ground penetrating radar, while the second sensor 112 comprises a camera. The data of the GPR 111 and the camera 112 are combined, so that an accurate SLAM (simultaneous localization and mapping) localization can be performed which leads to an exact self-localization (first data set 1DS). The first data set 1DS can further comprise object detection data (not shown). In the exemplary embodiment shown, the status sensor(s) 131 of the smart infrastructure 130 can comprise a camera and/or a radar for detecting the position of objects such as the vehicle 110. The status sensor(s) 131 can further detect the velocity of the objects (odometry). The derived status information of the vehicle 110 (and further vehicles/objects) represent the second data set 2DS. The first data set 1DS can be sent from the vehicle 110 to the infrastructure 130. In particular, in case that the infrastructure 130 comprises only a camera (and not a radar), a fused geo position of vehicles on the road can be derived by the smart infrastructure 130. Then, the first data set 1DS and the second data set 2DS are combined (fused) to obtain a reliable and safe cooperative strategy CS. In the example shown, the cooperative strategy CS is derived in the vehicle 110, while the smart infrastructure 130 provides a further traffic optimization calculation (e.g. calculated boundaries for the trajectory). Further, the smart infrastructure 130 provides a back-up trajectory for the vehicle 110, for example an emergency trajectory. The cooperative strategy CS leads to the provision of a vehicle (calculated) trajectory which is then forwarded to the (vehicle) motion controller (e.g. on automotive safety integrity level (ASIL) D) and uses a vehicle interface 115 (e.g. the on-board diagnosis (OBD)) to control the actuators of the vehicle 110. Finally, the vehicle actuators (in particular regarding steering, acceleration, and braking) are controlled based on the trajectory provided by the cooperative strategy CS. In addition, a feedback functionality can be integrated to enable a regulation of the system 300. For example, a vehicle odometry can be arranged at the OBD to feed-back velocity data to the trajectory calculation and the SLAM localization.

Figure 4:
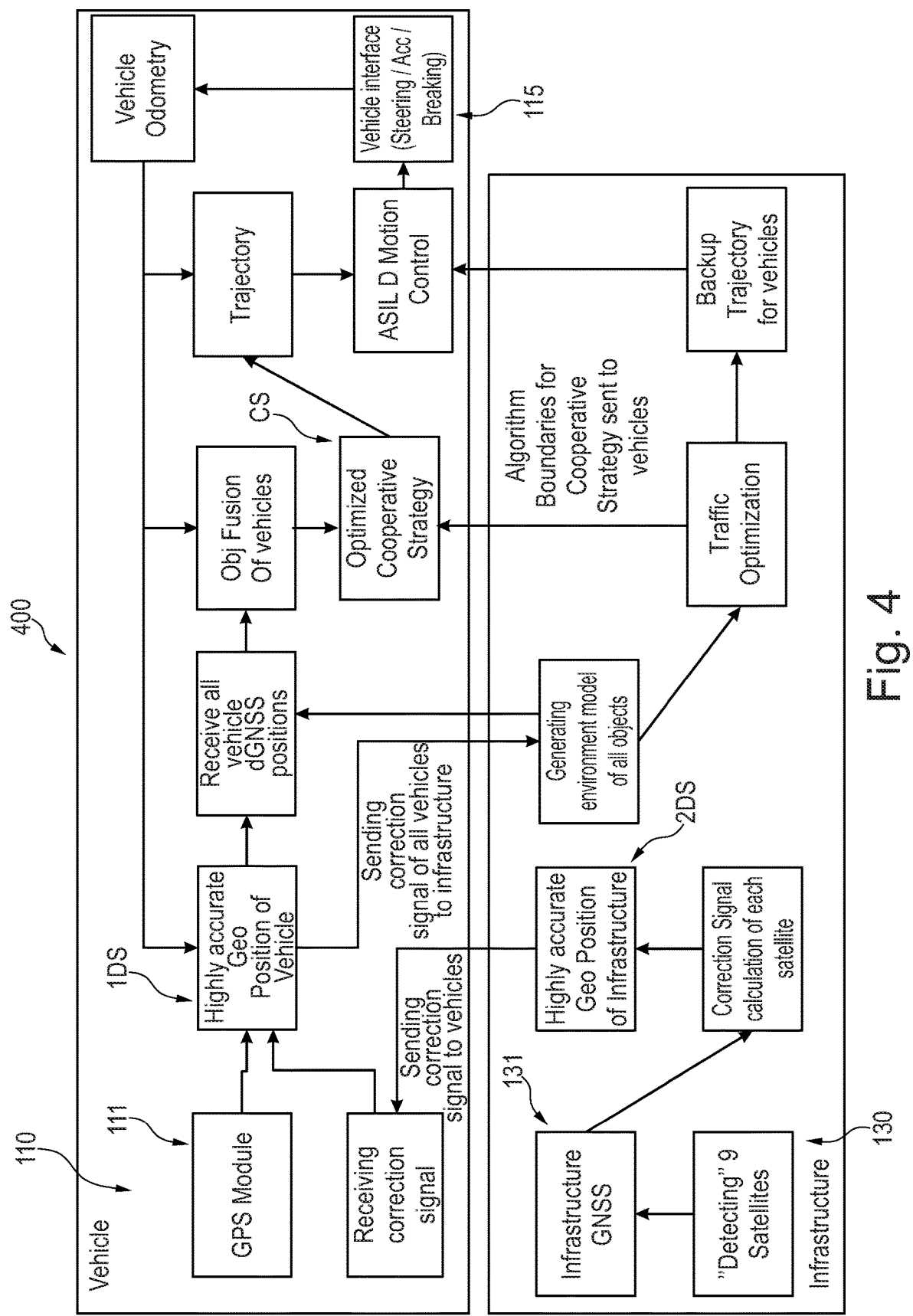
FIG. 4 shows deriving a cooperative strategy between a vehicle and a smart infrastructure according to a further exemplary embodiment of the present disclosure.

FIG. 4 shows a further flowchart of deriving the cooperative strategy CS between the vehicle 110 and the smart infrastructure 130 in a system 400 according to a further exemplary embodiment of the present disclosure. Deriving the cooperative strategy CS functions in principle in the same manner as described for FIG. 3 above, however, the localization of the vehicle 110 with an accuracy of at least 25 cm (in particular at least 15 cm) is implemented differentially. In this exemplary example, a high-precision GPS/GNSS (for example a differential GNSS) is applied. The vehicle 110 comprises a GPS module as the first localization sensor 111, while the second localization sensor (not shown) is e.g. a camera. The GPS module 110 performs a self-localization and determines a first data set 1DS. The status sensor(s) 131 of the smart infrastructure 130 comprises also a GPS functionality which is in contact with a plurality of satellites (e.g. nine). In the described manner, the smart infrastructure 130 can provide a highly accurate geo-position of the vehicle 110 as the status information (second data set 2DS) and sends said information to the vehicle 110, wherein said information is used as a correction signal for the GPS self-localization data. The corrected data (differential GNSS data) are sent again to the smart infrastructure 130, which takes into account as many objects of the environment as possible to calculate an object environment model based in the differential GNSS data. In summary, the first data set 1DS and the second data set 2DS are combined to obtain highly precise differential GNSS data and afterwards a reliable and safe cooperative strategy CS.

Figure 5:
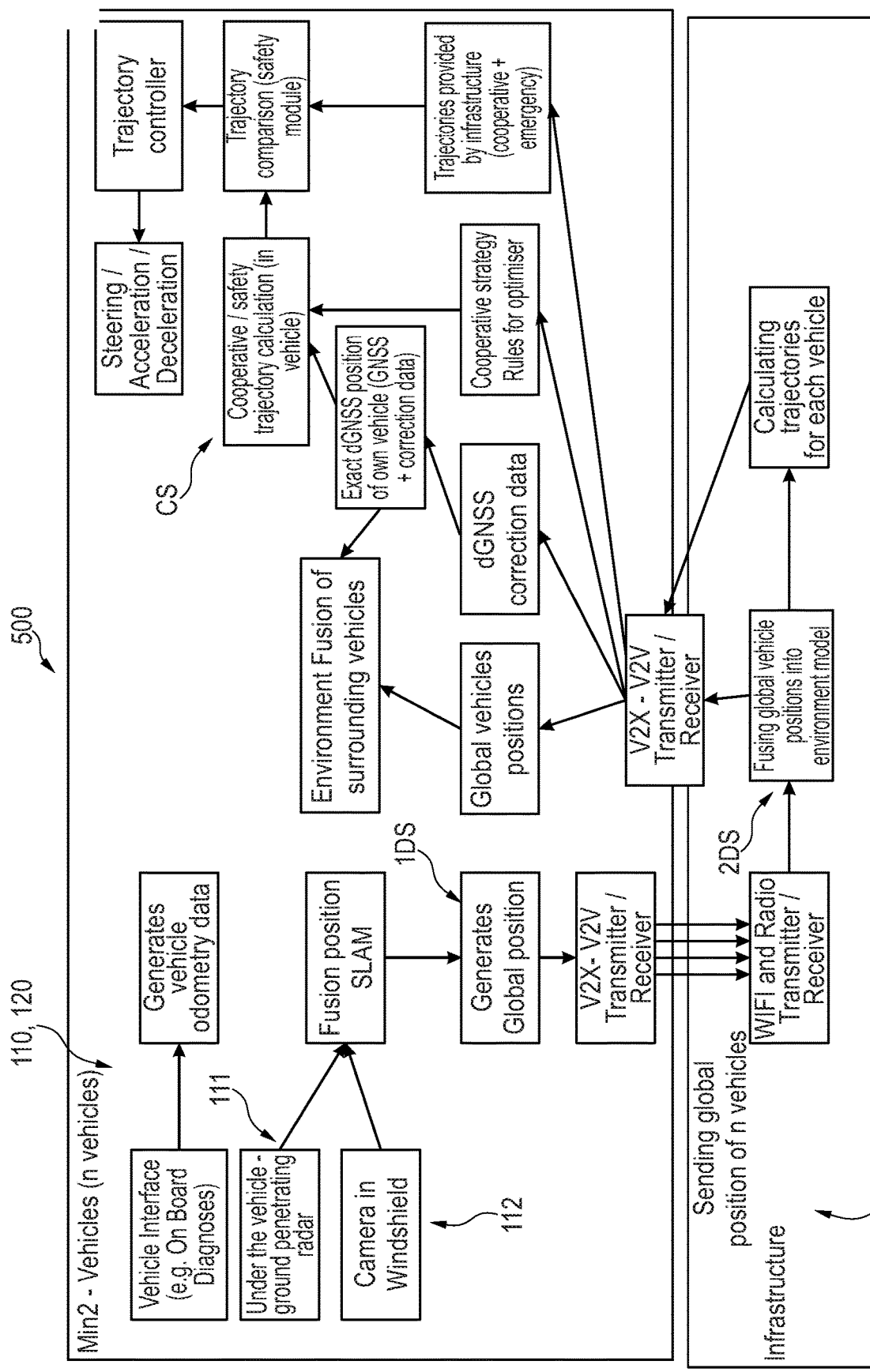
FIG. 5 shows deriving a cooperative strategy between a plurality of vehicles and a smart infrastructure according to another exemplary embodiment of the present disclosure.

FIG. 5 shows a flowchart of deriving the cooperative strategy CS between a plurality of vehicles 110, 120 and a smart infrastructure 130 of a traffic flow system 500 according to a further exemplary embodiment of the present disclosure. In this exemplary example, a plurality of vehicles 110, 120 are present from which one is described here representatively. The first localization sensor 111 comprises a GPR and the second localization sensor 112 comprises a camera (see e.g. FIG. 2 above). A self-localization for deriving a first data set 1DS is performed as described for FIG. 3 above. Then, the first data sets 1DS (of a plurality of vehicles 110, 120) are sent to (a receiver, e.g. via WiFi, to) the smart infrastructure 130. The smart infrastructure 130 combines (fuses) the localization information of the plurality of vehicles 110, 120 to calculate an object environment model. In particular, the smart infrastructure 130 calculates trajectories for each vehicle 110, 120 based on the object environment model. These data sets, combined with status information 131 determined by the smart infrastructure 130, are sent (e.g. via WiFi) to each of the vehicles 110, 120. Based on the calculated environment model and/or the infrastructure-calculated trajectories, each vehicle 110, 120 combines the first data set 1DS and the second data set 2DS in order to derive a cooperative strategy CS. Alternatively, the cooperative strategy CS can be calculated by one vehicle 110 and is then sent to the other vehicles 120. As shown in the Figure, the process of deriving the cooperative strategy CS can also comprise a correction of geo-position data (e.g. differential GNSS), optimization rules for deriving the cooperative strategy CS and cooperative/emergency trajectories (from the smart infrastructure 130). The cooperative strategy CS leads to the provision of a vehicle (calculated) trajectory which is then forwarded to the vehicle motion control. At this step, the vehicle calculated trajectory can be compared (again) with infrastructure-calculated (cooperative/emergency) trajectories for safety reasons. Finally, the vehicle actuators (in particular regarding steering, acceleration, and braking) are controlled via the trajectory provided based on the cooperative strategy CS. In addition, a feedback functionality can be integrated to enable a regulation of the system 500. In the Figure, this is demonstrated by a vehicle odometry arranged at the OBD to feed-back velocity data to the trajectory calculation.

REFERENCE SIGNS 100, 300 Traffic flow system
400, 500
101 Lane
102 Further lane
110 Vehicle
111 First (self-) localization sensor, ground penetrating radar
112 Second (object-) localization sensor, camera
115 Vehicle interface
120 Further vehicle
130 Smart infrastructure
131 Status sensor
132 Status information
1DS First data set
2DS Second data set
CS Cooperative strategy

The invention claimed is:

1. A method of organizing a trajectory of at least one self-driving vehicle, the method comprising:
providing the vehicle, wherein the vehicle comprises a first localization sensor and a second localization sensor, wherein the functionality of the second localization sensor is different from the functionality of the first localization sensor;
wherein the first localization sensor comprises a self-localization functionality that includes a ground penetrating radar;
wherein the second localization sensor comprises an object localization functionality;
driving the vehicle in a self-driving mode in a lane;
determining the localization of the vehicle, using the first localization sensor and the second localization sensor, with an accuracy of at least in order to obtain a first data set;
providing a smart infrastructure in proximity to the lane, wherein the smart infrastructure comprises one or more status sensors arranged along the lane;
determining a status information of the vehicle by the smart infrastructure, using the one or more status sensors, in order to obtain a second data set; and
wherein the one or more status sensors are configured to determine status information with respect to vehicles and/or obstacles within the traffic flow, and
wherein the status information comprises at least one of the following: a localization of the vehicle and/or an obstacle, a velocity of the vehicle and/or the obstacle, a distance between the vehicle with respect to the smart infrastructure, a distance between the vehicle and the obstacle;
coordinating the first data set and the second data set to derive a cooperative strategy for organizing the trajectory of the vehicle, wherein the cooperative strategy allows the self-driving mode is on safety level L2 or lower, and wherein the cooperative strategy allows the self-driving mode to be changed to at least safety level L4;
wherein the vehicle is a commercial end product, and wherein the method further comprises:
providing at least one of the first localization sensor and the second localization sensor by retrofitting the commercial end product wherein the cooperative strategy comprises:
deriving a vehicle-calculated trajectory;
deriving a further vehicle-calculated trajectory by a further vehicle and/or deriving an infrastructure-calculated trajectory by the smart infrastructure;
comparing the vehicle-calculated trajectory with the further vehicle calculated trajectory and/or the infrastructure-calculated trajectory; and
selecting one preferred trajectory or deriving a trajectory combination by the vehicle and/or by the smart infrastructure.

2. The method according to claim 1,
wherein the first localization sensor comprises a self-localization functionality, in particular at least one of the group which consists of: a self-localization sensor, an positioning functionality being essentially independent of weather conditions, a GPS functionality, a GNSS functionality, a SLAM functionality.

3. The method according to claim 1,
wherein the object-localization functionality comprises at least one of the group which consists of a camera, a radar, a lidar.

4. The method according to claim 1,
wherein the status sensor comprises at least one of the group which consists of:
a distance sensor, a velocity sensor, a localization sensor, a camera, a radar, a GPS, a differential GNSS.

5. The method according to claim 1, comprises at least one of the following:
a localization of the vehicle and/or an obstacle;
a velocity of the vehicle and/or the obstacle;
a distance between the vehicle with respect to the smart infrastructure;
a distance between the vehicle and the obstacle;
in particular wherein the obstacle is at least one of the group which consists of an object, a further vehicle, a living organism.

6. The method according to claim 1, wherein the method further comprises:
driving a further vehicle in a further self-driving mode in the lane or in a further lane in proximity to the lane;
determining a further status information of the further vehicle by the vehicle, using the second localization sensor, and/or by the smart infrastructure, using the status sensor, in order to obtain a third data set; and
wherein deriving the cooperative strategy further comprises:
coordinating the first data set and the second data set with the third data set.

7. The method according to claim 6, further comprising:
providing the further vehicle, wherein the further vehicle comprises a third localization sensor and a fourth localization sensor, wherein the fourth localization sensor is different from the third localization sensor;
determining a localization of the further vehicle, using at least one of the third localization sensor and the fourth localization sensor, with an accuracy of at least 25 cm, in particular at least 15 cm, in order to obtain a fourth data set; and wherein deriving the cooperative strategy further comprises:
coordinating the first data set, the second data set, and the third data set with the fourth data set.

8. The method according to claim 7,
wherein the further vehicle is a further commercial end product, and wherein the method further comprises:
providing at least one of the third sensor and the fourth sensor by retrofitting the further commercial end product.

9. The method according to claim 1,
wherein the further self-driving mode is on safety level L2 or lower, and
wherein the cooperative strategy allows the further self-driving mode to be changed to at least safety level L4.

10. The method according to claim 1,
wherein the cooperative strategy comprises:
coordinating the first data set with the second data set by the vehicle;
deriving a vehicle-calculated trajectory based on the coordination result; and
controlling at least one actuator of the vehicle based on the vehicle-calculated trajectory.

11. The method according to claim 1,
wherein selecting is done by at least one of by the vehicle and the smart infrastructure.

12. The method according to claim 1,
wherein the cooperative strategy comprises at least one of the following features:
providing status data, in particular localization data and/or velocity data, to the vehicle and/or the further vehicle by the smart infrastructure;
providing an infrastructure-calculated trajectory to the vehicle and/or the further vehicle by the smart infrastructure;
providing a vehicle-calculated trajectory by the vehicle to the further vehicle;
providing a further vehicle-calculated trajectory by the further vehicle to the vehicle;
providing a further infrastructure-calculated trajectory, in particular an emergency trajectory, to the vehicle and/or the further vehicle by the smart infrastructure;
providing an emergency reaction, in particular a warn sign, calculated by the smart infrastructure, to the vehicle and/or the further vehicle.

13. The method according to claim 1, wherein the cooperative strategy comprises:
controlling at least one actuator of the vehicle and/or the further vehicle indirectly via the cooperative strategy by the smart infrastructure.

14. The method according to claim 1,
wherein the cooperative strategy is free of a machine learning algorithm.

15. The method according to claim 1,
wherein the cooperative strategy comprises a fleet algorithm or a swarm intelligence algorithm.

16. The method according to claim 1,
wherein the vehicle and/or the further vehicle is one of the group which consists of a car, a truck, a motor cycle, a bus.

17. A method of retrofitting a vehicle being a commercial end product, wherein the vehicle comprises a self-driving mode, the method comprising:
retrofitting the vehicle with a first localization sensor and a second localization sensor, wherein the functionality of the second localization sensor is different from the functionality of the first localization sensor, so that the localization of the vehicle can be determined using at least one of the first localization sensor and the second localization sensor, with an accuracy of at least 15 cm, in order to obtain a first data set;
wherein the first localization sensor comprises a self-localization functionality that includes a ground penetrating radar;
wherein the second localization sensor comprises an object localization functionality;
retrofitting the vehicle with a communication unit for communicating with a smart infrastructure in proximity to a lane, which smart infrastructure determines a status information of the vehicle in order to obtain a second data set; and
retrofitting the vehicle with a control device that is configured to coordinate and/or configured to trigger a further entity to coordinate the first data set and the second data set to derive a cooperative strategy for organizing wherein the self-driving mode is on safety level L2 or lower, and
wherein the cooperative strategy allows the self-driving mode to be changed to at least safety level L4 wherein the cooperative strategy comprises:
deriving a vehicle-calculated trajectory;
deriving a further vehicle-calculated trajectory by a further vehicle and/or deriving an infrastructure-calculated trajectory by the smart infrastructure;
comparing the vehicle-calculated trajectory with the further vehicle calculated trajectory and/or the infrastructure-calculated trajectory; and
selecting one preferred trajectory or deriving a trajectory combination by the vehicle and/or by the smart infrastructure.

* * * * *

UNITED STATES PATENT AND TRADEMARK OFFICE
CERTIFICATE OF CORRECTION

PATENT NO. : 11,829,159 B2
APPLICATION NO. : 17/455355
DATED : November 28, 2023
INVENTOR(S) : Thomas Kuehbeck Page 1 of 1

It is certified that error appears in the above-identified patent and that said Letters Patent is hereby corrected as shown below:

In the Claims

In Column 15, Line 63, in Claim 1, after "least" insert -- 15 cm, --.

In Column 16, Lines 52-59, in Claim 5, after "claim 1," delete "comprises at least one of the following: a localization of the vehicle and/or an obstacle; a velocity of the vehicle and/or the obstacle; a distance between the vehicle with respect to the smart infrastructure; a distance between the vehicle and the obstacle; in particular".

In Column 18, Line 43, in Claim 17, after "organizing" insert -- the trajectory of the vehicle, --.

Signed and Sealed this
Third Day of September, 2024

Katherine Kelly Vidal
*Director of the United States Patent and Trademark Office*